March 31, 1970
D. C. BICHEL
3,503,533
COMBINE GRAIN TANK LOADING SYSTEM
Filed Oct. 4, 1968
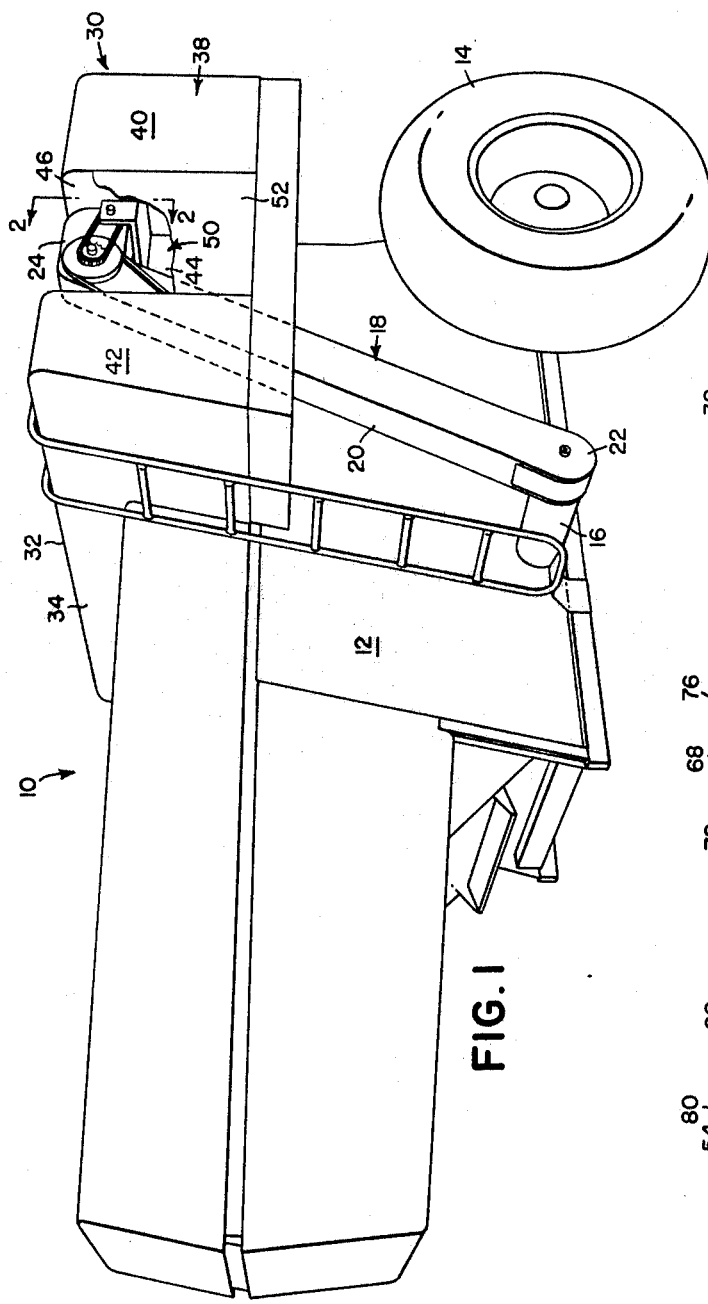
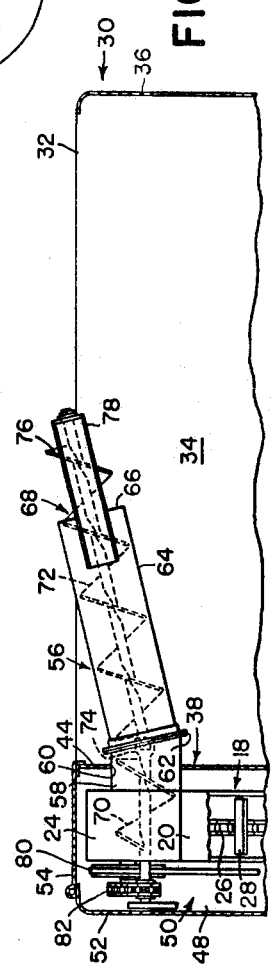
INVENTOR.
D. C. BICHEL

United States Patent Office 3,503,533
Patented Mar. 31, 1970

3,503,533
COMBINE GRAIN TANK LOADING SYSTEM
Darwin Carl Bichel, East Moline, Ill., assignor to Deere & Company, Moline, Ill., a corporation of Delaware
Filed Oct. 4, 1968, Ser. No. 765,048
Int. Cl. B60p 1/42
U.S. Cl. 214—519                                    5 Claims

ABSTRACT OF THE DISCLOSURE

A pull-type combine has an elevated grain tank that overhangs both sides of the main separator body and a clean grain elevator alongside the body has its discharge end disposed in a recess in the grain tank side wall below the top of the grain tank. The clean grain elevator feeds a cantilevered upwardly and inwardly inclined auger which moves the grain through the grain tank side wall and discharges it in the center of the tank at approximately the level of the grain tank top.

BACKGROUND OF THE INVENTION

This invention relates to a combine grain tank and a loading system therefor.

Current combines conventionally include an elevated grain tank in which the harvested crop is temporarily stored during the harvesting operation for discharge at appropriate intervals into attendant vehicles or receptacles. In order that the harvesting operation not be interrupted at frequent intervals to empty the grain tanks, relatively large capacity grain tanks are provided, the grain tanks generally having a greater width than the main separator body of the combine on which they are mounted and overhang the combine body on both sides. Some grain tanks are of the saddle type and include depending portions on both sides of the combine, while others have a unitary construction and are disposed entirely above the separating mechanism.

The grain tanks are conventionally loaded by a clean grain elevator which collects the clean grain from the grain cleaning mechanism and elevates it along one side of the combine body to the top of the grain tank. The unitary-type grain tanks cover a relatively large horizontal area, and it has become necessary to provide additional conveyor means, usually of the auger type, to distribute the crop within the grain tank, since the elevator is disposed at one side of the grain tank and if the grain were discharged at the discharge end of the elevator, the grain tank would be unevenly loaded and the full capacity of the tank could not be utilized.

SUMMARY OF THE INVENTION

According to the present invention, an improved grain tank and grain tank loading system is provided to give improved distribution of the grain within the grain tank, while not increasing the height of the combine above the level of the top of the tank. More specifically, the upper end of the clean grain elevator is disposed below the top of the grain tank and a transverse auger-type conveyor is provided at the upper or discharge end of the elevator, the outer or intake end of the auger being disposed below the discharge end of the elevator and the inner portion of the auger being inclined upwardly and inwardly, so that the discharge end of the auger is disposed at approximately the level of the top of the grain tank and at approximately the center of the tank, providing a fountain-type distribution of the grain at the center of the tank. Another feature of the invention resides in the cantilevered construction of the grain tank auger. Still another feature of the invention resides in mounting the upper end of the clean grain elevator and the outer end of the grain tank distributing auger within a recess in the outer side wall of the grain tank and providing panel means to cover the recess, so that the outer side wall of the grain tank is relatively smooth and disposed outwardly of the elevator, to give the combine an uncluttered appearance in the area of the clean grain elevator and grain tank auger and provide shielding for the drive associated therewith.

BRIEF DESCRIPTION OF THE DRAWINGS

FIG. 1 is a right rear fragmentary perspective of a pull-type combine embodying the present invention, a portion of the side panelling opposite the upper end of the elevator being broken away to more clearly show the invention.

FIG. 2 is an enlarged upright transverse fragmentary section of the upper portion of the grain tank and the grain tank loading system as viewed generally along the line 2—2 of FIG. 1.

DESCRIPTION OF THE PREFERRED EMBODIMENT

The invention is embodied in a pull-type PTO powered combine having a conventional general construction which includes a fore-and-aft elongated main separator body 10, having opposite upright side walls 12 and mounted on a pair of transversely spaced wheels 14, only the right-hand side wall 12 and wheel 14 being shown in the drawings. The combine includes a forwardly extending feeder house and transversely extending harvesting platform or header at the forward end of the feeder house, and is connected to the towing vehicle by a fore-and-aft draft member above which is mounted a fore-and-aft drive shaft connecting the combine drive components to the tractor PTO shaft, all the above components being conventional and not shown in the drawings. Mounted within the body 10 between the side walls 12 is a grain separating mechanism, also not shown, which separates the grain from the straw or the like, the cleaned grain eventually being deposited at a collecting location near the bottom of the body 10. A grain collecting auger-type conveyor 16 moves the collected clean grain laterally through the right side wall 12 and delivers it to a clean grain elevator, indicated generally by the numeral 18. The elevator 18 is spaced from the side wall 12 to provide room for the conventional separating mechanism drive components (not shown) which are mounted on the side wall of the combine.

The elevator 18 typically includes a hollow elongated housing 20, having a rectangular cross section and has a lower or intake end 22, communicating with the discharge end of the auger 16, and an elevated discharge end 24, which is upwardly and forwardly of the intake end 22. The housing encloses a continuous chain 26 which carries a number of paddles or flights 28 at appropriate intervals, the flights 28 moving along the lower surface of the housing to move the grain from the intake end of 22 to the discharge end 24, the grain falling into the enlarged housing chamber at the discharge end. All of the above, of course, represents more or less conventional clean grain elevator construction.

Mounted on top of the body 10 generally above the wheels 14 is an elevated grain tank 30 having a horizontal open top 32, an upright rear wall 34, an upright front wall (not shown), and upright offset left and right side walls 36 and 38, respectively. The grain tank 30 is substantially wider than the separator body, so that the opposite grain tank side walls 36 and 38 are respectively disposed outwardly from the respective body side walls 12, the grain tank overhanging the main separator body 10 to a substantial degree.

The right side wall 38 is somewhat irregular in shape and includes a pair of outer side wall portions 40 and 42, lying in substantially the same fore-and-aft vertical plane, and an inner side wall portion 44 which is offset inwardly from and disposed between the outer side wall portions 40 and 42, the opposite ends of the inner side wall portion 44 being connected to the respective outer side wall portions 40 and 42 by front and rear laterally outwardly extending wall portions 46 and 48. The space between the front and rear lateral portions 46 and 48 and outwardly of the inner side wall portion 44 forms a pocket or recess 50, which is open outwardly and vertically upwardly and downwardly, the upper or discharge end 24 of the elvator 18 being disposed with the recess 50 and the elevator extending downwardly through the open bottom of the recess 50. The rear lateral wall portion 48 is inclined downwardly and rearwardly to accommodate the downward and rearward inclination of the elevator. The recess 50 is covered by an upright removable outer panel 52, which is flush with the outer side wall portions 40 and 42, and a raisable horizontal top panel 54, which lies in the same plane as the top of the grain tank, the raisable top panel 54 providing access to the upper or discharge end 24 of the elevator.

The grain falling from the discharge end 24 of the elevator 18 is delivered into the grain tank by a grain tank loading or distributing conveyor, indicated in its entirety by the numeral 56. The conveyor 56 is an auger-type conveyor and includes a tubular horizontal outer portion 58 adjacently below and communicating with the discharge end 24 of the elevator and extending transversely through a circular opening 60 in the inner side wall portion 44. The inner end 62 of the outer tube portion 58 is adjacent the wall portion 44 and canted from the vertical so that it faces upwardly and inwardly and an upwardly and inwrdly inclined inner auger tube portion 64 is rigidly connected to and in communication with the inner end 62 of the outer auger tube portion 58. As seen in FIG. 2, the inner end 62 of the outer auger tube portion 58 is spaced below the level of the grain tank top 32, while the inner or discharge end 66 of the inner auger tube portion 64 is above the auger tube portion 58 and at substantially the level of the grain tank top at approximately the center of the grain tank.

A two-part helical flight auger 68 is rotatably mounted in the auger tube portions 64 and 58, and includes a horizontal outer portion 70 mounted in and coextensive with the outer tube portion 58 and an upwardly and inwardly inclined inner portion 72 rotatably mounted in the inner auger tube portion 64, the two auger portions 70 and 72 being drivingly connected by a universal joint 74. The inner or discharge end 76 of the inner auger portion 72 projects through the discharge end 66 of its auger tube and is journaled in the intermediate or bight portion of a U-shaped support bracket 78 mounted over the discharge end 66 of the inner auger tube portion 64, the opposite legs of the bracket 78 being secured to the opposite sides of the auger tube.

The elevator 18 is driven by a belt drive 80 at the upper or discharge end 24 of the elevator and the auger 68 is driven from the elevator drive 80 through a chain drive 82, both the drives 80 and 82 being disposed within the recess 50 and covered by the panels 52 and 54. The elevator drive 80 is connected to and driven by the conventional separator drive components alongside the combine.

In operation, the clean grain is collected and delivered laterally from the main separator body 10 by the grain collecting auger 16 and elevated to the discharge end 24 of the elevator 18. The grain falling from the discharge end 24 falls into the outer tube portion 58 of the grain tank loading conveyor 56, the outer tube portion 58 communicating with and forming an integral part of the discharge end of the elevator and being disposed substantially below the level of the grain tank top 32. The grain in the outer tube portion 58 is then moved inwardly through the grain tank side wall and then upwardly and inwardly through the inner auger tube portion 64 to the discharge end 66 from which the grain falls into the interior of the grain tank. Since the inner portion 72 of the auger 68 extends beyond the discharge end 66, it tends to scatter the grain falling through the discharge end. Also, since the discharge end 66 is approximately located at the center of the grain tank, the tank is loaded relatively evenly. Although the discharge end 66 is disposed at the level of the top of the grain tank, so that the tank can be filled to its top, little of the grain tank loading system extends above the level of the top of the tank, so that the overall height of the combine is not significantly increased. As is apparent from the drawings, the cantilevered construction of the grain tank loading conveyor 56 provided an uncluttered grain tank, and the disposition of the upper discharge end 24 of the elevator and the outer end of the grain tank loading conveyor 56 within the recess 50 permits the covering of said components with the panels 52 and 54 so that the exterior of the grain tank is smooth and presents an uncluttered appearance, for both aesthetic and safety advantages.

I claim:

1. In a combine having a main separator body with opposite upright sides and a clean grain collector conveyor adapted to move clean grain laterally outwardly from one side of the body, the improvement comprising: an elevated grain tank mounted on the body and having an open top and opposite lateral side walls; a clean grain elevator extending upwardly along one side of the body and having a lower intake end connected to the clean grain collector conveyor in a crop-receiving relationship therewith and an upper discharge end below the level of the grain tank top adjacent one of the grain tank side walls; and a cantilevered generally laterally and inwardly extending grain tank loading conveyor mounted on the grain tank and having an intake end connected to and in crop-receiving relationship with the discharge end of the clean grain elevator below the level of the grain tank top, said loading conveyor also having a portion within the grain tank inclined upwardly and inwardly from said one side wall of the grain tank and a discharge end approximately at the level of the grain tank top and proximate to the center of the grain tank.

2. The invention defined in claim 1 wherein said one grain tank side wall has an inwardly offset portion between a pair of outer side wall portions which are disposed outwardly of the side of the separator body to form an outwardly and downwardly opening recess in the side wall, the discharge end of the elevator and the intake end of the grain tank loading conveyor being disposed within said recess, and the loading auger extending through the inwardly offset portion of the side wall.

3. The invention defined in claim 2 wherein the grain tank loading conveyor includes a generally horizontal outer portion extending through the inwardly offset side wall portion and having a horizontal auger member, the inner loading conveyor portion including an upwardly and inwardly inclined auger member, and universal joint means drivingly connecting the horizontal auger member to the inclined auger member.

4. The invention defined in claim 3 wherein the inner portion of the grain tank loading conveyor includes a laterally extending upwardly and inwardly inclined auger tube having a first end proximate to the inwardly offset portion of the side wall and a second end proximate to the center of the grain tank, and a bracket mounted on and extending from the second end of the auger tube, the inner conveyor portion auger extending through and projecting beyond the second end of the auger tube and having its end journaled in the bracket.

5. The invention defined in claim 2 wherein the opposite side walls of the grain tank are spaced outwardly from the respective sides of the separator body so that the grain tank overhangs both sides of the separator body, the outer side wall portions of said one side being generally coplanar and also including an upright panel disposed between and in the same plane as the outer side wall portions and operatively spanning the recess in said one side wall to present a relatively smooth outer lateral surface.

References Cited

UNITED STATES PATENTS 2,848,858    8/1958    Kepkay et al. ____ 56—473.5 XR

ALBERT J. MAKAY, Primary Examiner

U.S. Cl. X.R.

214—83.32